(12) United States Patent
Lee

(10) Patent No.: US 7,558,010 B2
(45) Date of Patent: Jul. 7, 2009

(54) OPTICAL PICK-UP ACTUATOR AND OPTICAL RECORDING AND/OR REPRODUCING APPARATUS INCLUDING THE OPTICAL PICK-UP ACTUATOR

(75) Inventor: Myoung-wook Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 11/362,123

(22) Filed: Feb. 27, 2006

(65) Prior Publication Data
US 2006/0262703 A1 Nov. 23, 2006

(30) Foreign Application Priority Data
May 18, 2005 (KR) ............ 10-2005-0041448

(51) Int. Cl.
*G02B 7/02* (2006.01)
(52) U.S. Cl. .............. 359/814; 359/811; 359/819
(58) Field of Classification Search ......... 359/811–819, 359/824; 369/112.01, 44.01
See application file for complete search history.

(56) References Cited

U.S. PATENT DOCUMENTS

| | | | |
|---|---|---|---|
| 6,016,292 A * | 1/2000 | Lee ............ | 369/44.15 |
| 7,012,768 B2 * | 3/2006 | Hirose et al. ....... | 359/822 |
| 2002/0196720 A1 | 12/2002 | Takeshita ........ | 369/53.19 |
| 2003/0128443 A1 | 7/2003 | Jang et al. ......... | 359/824 |
| 2004/0109395 A1* | 6/2004 | Ju et al. ......... | 369/44.22 |
| 2007/0274164 A1* | 11/2007 | Usami et al. ........ | 369/30.1 |

FOREIGN PATENT DOCUMENTS

| | | |
|---|---|---|
| EP | 1 316 949 A2 | 6/2003 |
| EP | 1 416 479 A2 | 5/2004 |
| JP | 7-65397 | 3/1995 |
| JP | 10-13482 | 5/1998 |
| JP | 2001-325739 | 11/2001 |
| JP | 2002-312961 | 10/2002 |
| JP | 2004-110971 | 4/2004 |
| KR | 1999-69631 | 9/1999 |
| KR | 10-284692 | 12/2000 |
| WO | WO 2005/088619 | 9/2005 |

OTHER PUBLICATIONS

Search Report issued in European Patent Application No. 06114152.9 on Nov. 20, 2006.
Junya Aso et al., "High Response Actuator with Tilt Function for 12.7 mm Slim Optical Disc Drives.", Optical Memory and Optical Data Storage Topical Meeting, 2002. International Symposium on Jul. 7-11, 2002, Piscataway, NJ, pp. 326-328.

(Continued)

*Primary Examiner*—Mohammed Hasan
(74) *Attorney, Agent, or Firm*—Stein McEwen, LLP

(57) ABSTRACT

An optical pick-up actuator having a servo control system with increased stability includes a base, a lens holder mounted on the base to be tiltable about a tilting axis of the lens holder, at least one objective lens being mounted on the lens holder, and at least one groove being formed in the lens holder, and a magnet unit mounted on the base and extending into the at least one groove. Walls of the least one groove facing the magnet unit in a direction transverse to the tilting axis include sloping surfaces providing a tilting margin to enable tilting control to be performed.

25 Claims, 5 Drawing Sheets

OTHER PUBLICATIONS

Byung Youn Song et al., "The Actuator for High Speed CD/DVD Rewritable System.", Optical Memory and Optical Data Storage Topical Meeting, 2002, International Symposium on Jul. 7-11, 2002, Piscataway, NJ, pp. 353-355.

Tae-Yong Doh et al., "Radial Tilt Detection Using One Beam and Its Compensation in a High-Density Read Only Memory.", Mar. 2001, Japanese Journal of Applied Physics Japan Society of Applied Physics, Tokyo, JP, vol. 40, pp. 1680-1683.

* cited by examiner

OPTICAL PICK-UP ACTUATOR AND OPTICAL RECORDING AND/OR REPRODUCING APPARATUS INCLUDING THE OPTICAL PICK-UP ACTUATOR

CROSS-REFERENCE TO RELATED APPLICATIONS

This application claims the benefit of Korean Patent Application No. 2005-41448 filed on May 18, 2005, in the Korean Intellectual Property Office, the disclosure of which is incorporated herein by reference.

BACKGROUND OF THE INVENTION

1. Field of the Invention

An aspect of the present invention relates to an optical recording and/or reproducing apparatus, and in particular to an optical pick-up actuator having a servo control system with increased stability.

2. Description of the Related Art

An optical pick-up typically used to record and/or reproduce information onto and/or from an optical medium such as a CD (Compact Disc) or a DVD (Digital Versatile Disc) includes an optical system having an objective lens to focus light from a light source onto an optical medium to record and/or reproduce information onto and/or from the optical medium, and an optical pick-up actuator to adjust a distance between the objective lens and the optical medium, and a position and a tilt of an optical axis of the objective lens.

The optical pick-up actuator performs servo control including focusing control to maintain a constant distance between the optical medium and the objective lens, tracking control to control a position of the optical axis of the objective lens in a radial direction of the optical medium, and tilting control to make the optical axis of the objective lens perpendicular to the optical medium. The focusing control is performed by moving a lens holder on which the objective lens is mounted toward and away from the optical medium to control the distance between the objective lens and the optical medium, and the tracking control is performed by moving the lens holder in the radial direction of the optical medium. The tilting control is performed by tilting the lens holder in the radial direction of the optical medium about a tilting axis parallel to a tangential direction of the optical medium, known as "radial tilt," and/or tilting the lens holder in the tangential direction of the optical medium about a tilting axis parallel to the radial direction of the optical medium, known as "tangential tilt."

For the purpose of performing the servo control described above, the optical pick-up actuator has plural magnet members and plural coils. If electric currents are supplied to the coils, the position and tilt of the lens holder are controlled by electromagnetic forces generated by interactions between the magnet members and the coils having the electric currents supplied thereto. Two or more pairs of magnet members may be used to generate such electromagnetic forces. In order to miniaturize the optical pick-up actuator, grooves may be formed in the lens holder and at least some of the magnet members may extend into the grooves. In such a case, it is necessary to maintain a certain gap between the walls of the grooves and the magnet members used to perform the tilting control and/or the tracking control. This gap serves as a tracking margin for performing the tracking control, and also serves as a tilting margin for performing the tilting control. The tracking margin is a space in which the lens holder is free to move in the radial direction of the optical medium without contacting any part of the optical pick-up actuator while the tracking control is being performed, and the tilting margin is a space in which the lens holder is free to tilt about the tilting axis without contacting any part of the optical pick-up actuator while the tilting control is being performed.

When the tilting control and the tracking control are performed, however, the gap may be reduced as the lens holder is tilted and moved. That is, while the tilting control is being performed, the gap, which serves as the tracking margin for performing the tracking control, may be reduced as the lens holder tilts about the tilting axis. To the contrary, while the tracking control is being performed, the gap, which serves as the tilting margin for performing the tilting control, may be reduced as the lens holder moves in the radial direction of the optical medium. Such a reduction of the tracking margin and/or the tilting margin means that a margin for performing the servo control of the optical pick-up actuator is reduced, which contributes to a deterioration in a stability of the servo control. In particular, if an excessively deformed optical medium is used, a situation may arise in which the tilting control cannot be successfully performed because the tilting margin has been reduced, which may cause the optical pick-up actuator to collide with the optical medium.

SUMMARY OF THE INVENTION

Accordingly, the present invention addresses the above-mentioned problems in the related art, and an aspect of the present invention is to provide an optical pick-up actuator having a servo-control system with increased stability, and an optical recording and/or reproducing apparatus including the optical pick-up actuator.

In accordance with one aspect of the invention, an optical pick-up actuator includes a base, a lens holder mounted on the base to be tiltable about a tilting axis of the lens holder, at least one objective lens being mounted on the lens holder, and at least one groove being formed in the lens holder, and a magnet unit mounted on the base and extending into the at least one groove, wherein walls of the at least one groove facing the magnet unit in a direction transverse to the tilting axis include sloping surfaces providing a tilting margin to enable tilting control to be performed.

Center lines which are parallel to the tilting axis may extend through centers of the walls of the at least one groove facing the magnet unit as viewed in directions of the center lines. Each of the sloping surfaces may include a first sloping surface and a second sloping surface each inclined away from the magnet unit beginning at one of the centers of the walls of the at least one groove facing the magnet unit as viewed in the direction of one of the center lines. A focusing direction of the lens holder may be perpendicular to the tilting axis. Reference axes which are parallel to the focusing direction may intersect the centers of the end walls of the at least one groove facing the magnet unit as viewed in the directions of the center lines when the lens holder is not tilted. An angle between the first sloping surface and one of the reference axes when the lens holder is not tilted and an angle between the second sloping and one of the reference axes when the lens holder is not tilted may be larger than a maximum tilting angle of the lens holder about the tilting axis. A tangential direction of the lens holder may be perpendicular to the tilting axis and the focusing direction. The at least one groove may include a first groove and a second groove parallel to each other and spaced apart from each other in the tangential direction. The magnet unit may include a yoke mounted on the base, and may further include a magnet member mounted on one side of the yoke.

In accordance with another aspect of the present invention, walls of the at least one groove facing the magnet unit in a direction transverse to the tilting axis include curved surfaces providing a tilting margin to enable tilting control to be performed. The curved surfaces may be hemispherical surfaces.

In accordance with another aspect of the invention, an optical recording and/or reproducing apparatus includes an optical pick-up including an actuator to drive at least one objective lens, the optical pick-up being mounted to be movable in a radial direction of an optical medium to record and/or reproduce information onto and/or from the optical medium, and a controller to control driving of the optical pick-up, wherein the actuator includes a base; a lens holder mounted on the base to be tiltable about a tilting axis of the lens holder, the at least one objective lens being mounted on the lens holder, and at least one groove being formed in the lens holder, and a magnet unit mounted on the base and extending into the at least one groove, wherein walls of the at least one groove facing the magnet unit in a direction transverse to the tilting axis include sloping surfaces providing a tilting margin to enable tilting control to be performed and a tracking margin to enable tracking control to be performed.

In accordance with another aspect of the present invention, an optical pick-up actuator includes a base, a lens holder mounted on the base to be tiltable about a tilting axis of the lens holder and having at least one groove formed therein, at least one objective lens mounted on the lens holder, and a magnet unit mounted on the base and extending into the at least one groove, wherein walls of the at least one groove facing the magnet unit in a direction transverse to the tilting axis have a shape that prevent gaps between the walls and the magnet unit from being reduced when the lens holder is tilted about the tilting axis.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
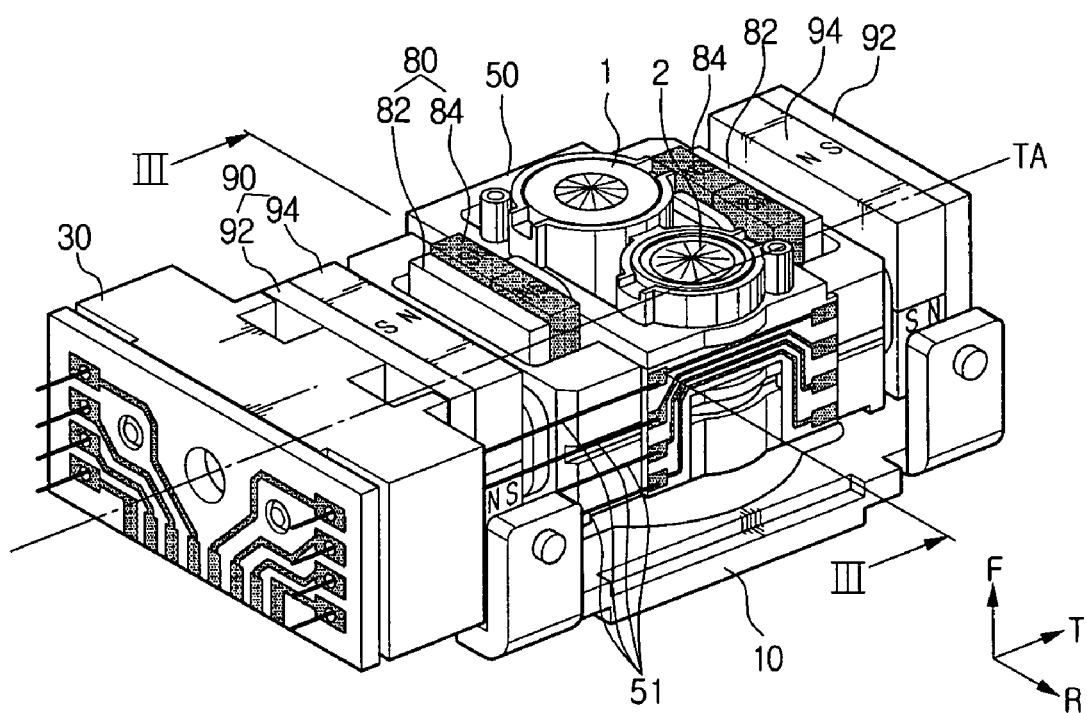
FIG. 1 is a perspective view showing an optical pick-up actuator according to a first embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
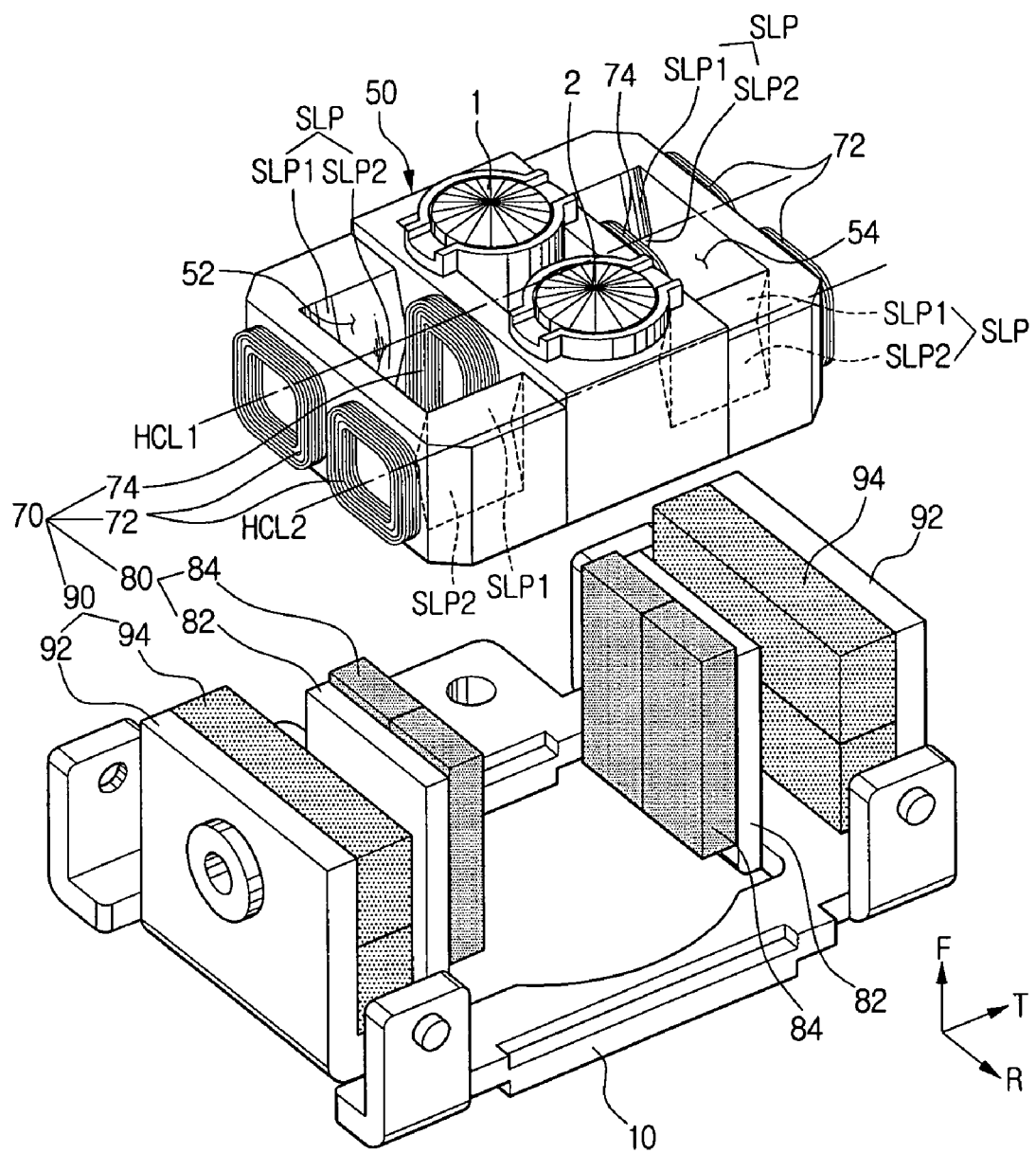
FIG. 2 is an exploded perspective view of the optical pick-up actuator shown in FIG. 1.
Figure 3:
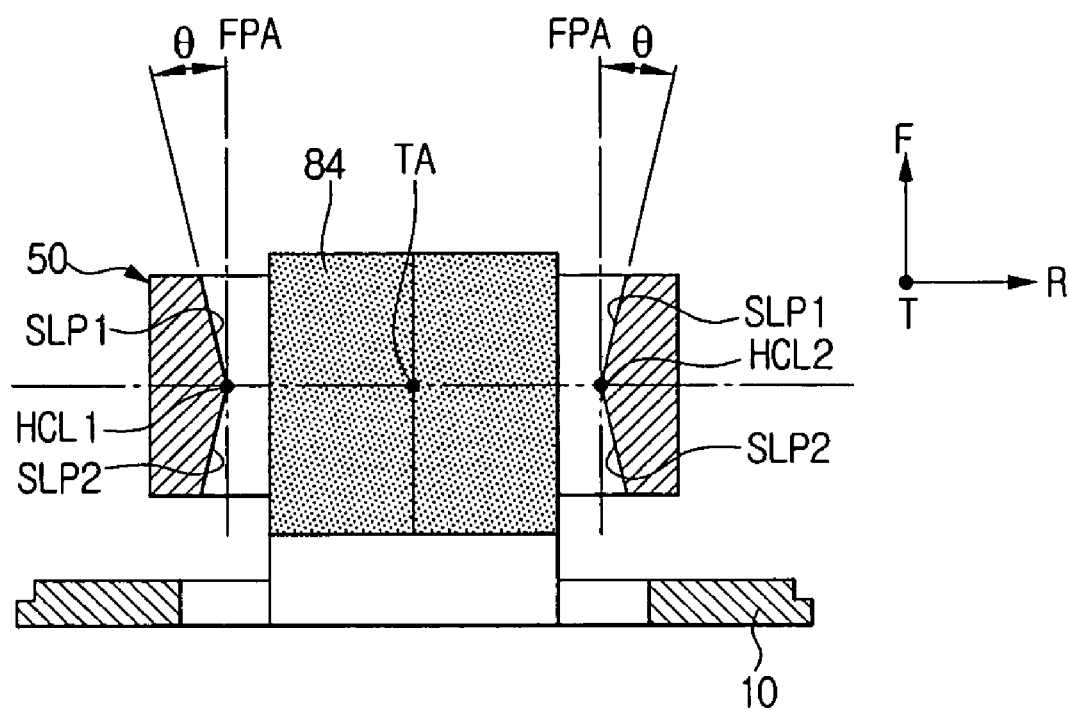
FIG. 3 is a cross-sectional view taken along the line III-III in FIG. 1.

Referring to FIGS. 1 to 3, an optical pick-up actuator 100 according to a first embodiment of the present invention includes a base 10, a supporting holder 30 mounted on the base 10, a lens holder 50 movably mounted on the base 10 and having two objective lenses 1, 2 mounted thereon, and magnetic circuitry 70 to perform servo control of the lens holder 50.

The lens holder 50 is connected to plural supporting members 51, each of which may be, for example, a wire spring having one end supported by the supporting holder 30 and the other end connected to the lens holder 50. This mounting arrangement enables the lens holder 50 to move relative to the base 10 in tilting, tracking, and focusing directions. The two objective lenses 1, 2 mounted on the lens holder 50 are arranged in a radial direction R of the optical pick-up actuator 100 with their optical axes being parallel to each other. The radial direction R of the optical pick-up actuator 100 corresponds to a radial direction of an optical medium. One of the two objective lenses 1, 2 is used to record and/or reproduce information onto and/or from an optical medium having a relatively lower recording density, such as a CD (Compact Disc) or a DVD (Digital Versatile Disc), and the other one of the two objective lenses 1, 2 is used to record and/or reproduce information onto and/or from an optical medium having a relatively higher recording density, such as an HD-DVD (High-Definition DVD) or a BD (Blu-ray Disc). However, the lens holder 50 may be modified so that a single objective lens is mounted thereon, or so that three or more objective lenses having different working distances are mounted thereon to be used to record and/or reproduce information onto and/or from three or more types of optical media having different recording densities.

First and second grooves 52, 54 are formed in the lens holder 50 near opposite ends of the lens holder 50 in a tangential direction T of the optical pick-up actuator 100. The tangential direction T is perpendicular to the radial direction R, and corresponds to a tangential direction of an optical medium. A tilting axis TA of the lens holder 50 (see FIG. 3) is parallel to the tangential direction T. The first and second grooves 52, 54 are parallel to each other. A first magnet unit 80 described below extends into the first and second grooves 52, 54.

End walls of the first and second grooves 52, 54 are parallel to the tangential direction T, and are inclined away from the magnet unit 80 relative to a focusing direction F as described in greater detail below. The focusing direction F is perpendicular to both the radial direction R and the tangential direction T, and is a direction in which the lens holder 50 is moved toward and away from an optical medium to perform focusing control. Each of the first and second grooves 52, 54, has a first end wall on one side of the tilting axis TA, and a second end wall on the opposite side of the tilting axis TA. A first center line HCL1 which is parallel to the tangential direction T extends through centers of the first end walls of the first and second grooves 52, 54 as viewed in a direction of the first center line HCL1, and a second center line HCL2 which is parallel to the tangential direction T extends through centers of the second end walls of the first and second grooves 52, 54 as viewed in a direction of the second center line HCL2.

The first and second end walls of the first and second grooves 52, 54 have sloping surfaces SLP which comprise first sloping surfaces SLP1 forming upper parts of the first and second end walls above the centers of the first and second end walls as viewed in the directions of the first and second center lines HCL1, HCL2, and second sloping surfaces SLP2 forming lower parts of the first and second end walls below the centers of the first and second end walls as viewed in the direction of the center lines HCL1, HCL2. The first and second sloping surfaces SLP1, SLP2 are inclined away from the first magnet unit 80 relative to the focusing direction F beginning at the centers of the first and second end walls. An axis FPA which is parallel to the focusing direction F intersects the centers of the first end walls of the first and second grooves 52, 54 as viewed in the direction of the first center line HCL1 when the lens holder 50 is not tilted, and another axis FPA which is parallel to the focusing direction F intersects the centers of the second end walls of the first and second grooves 52, 54 as viewed in the direction of the second center line HCL2 when the lens holder 50 is not tilted. It is preferable that slope angles θ of the first and second sloping surfaces SLP1, SLP2 relative to the two axes FPA when the lens holder 50 is not tilted are greater than a maximum tilting angle of the lens holder 50.

Side walls of the first and second grooves 52, 54 are parallel to the radial direction R and the focusing direction F, and are perpendicular to the tangential direction T. Each of the first and second grooves 52, 54 has an inner side wall relatively closer to a center of the optical pick-up actuator 100, and an outer side wall relatively farther away from the center of the optical pick-up actuator 100.

The magnetic circuitry 70 includes two tracking coils 74, four tilting coils 72, and first and second magnet units 80, 90.

The two tracking coils 74 are respectively mounted on the inner side walls of the first and second grooves 52, 54. The tracking coils 74 receive electric currents to perform tracking control through any one of the supporting members 51.

The four tilting coils 72 are mounted on opposite ends of the lens holder 50 in the tangential direction T, with two tilting coils 72 being provided on each of the opposite ends. The tilting coils 72 receive electric currents to perform tilting control and focusing control through one of the supporting members 51 other than the one of the supporting members 51 through which the tracking coils 74 receive electric currents.

The first magnet unit 80 includes two first yokes 82 mounted on the base 10 so that the first yokes 82 are parallel to each other and to the radial direction R, are spaced apart from each other in the tangential direction T, and are spaced inward from opposite ends of the base 10 in the tangential direction T, and two first magnet members 84 respectively mounted on the first yokes 82. The first yokes 82 having the first magnet members 84 mounted thereon respectively extend into the first and second grooves 52, 54 so that the first magnet members 84 respectively face the tracking coils 74. The first yokes 82 guide magnetic lines generated by the first magnet members 84 so that the magnetic lines are focused in one direction, that is, toward the tracking coils 74, thereby maximizing the intensity of an effective magnetic field generated by the first magnet members 84. Each of the first magnet members 84 comprises two magnets having opposite polarities placed side by side in the radial direction R. For example, as shown in FIGS. 1 to 3, each of the first magnet members 84 includes a first magnet on one side of the tilting axis TA having an N pole facing one of the tracking coils 74, and a second magnet on the other side of the tilting axis TA having an S pole facing the same tracking coil 74. When electric currents are supplied to the tracking coils 74, the first magnet members 84 interact with the tracking coils 74 having the electric currents supplied thereto to drive the lens holder 50 in the radial direction R to perform tracking control.

The second magnet unit 90 includes two second yokes 92 mounted on the base 10 so that the second yokes 92 are parallel to each other and to the radial direction R, are spaced apart from each other in the tangential direction T, and are at or near the opposite ends of the base 10 in the tangential direction, and two second magnet members 94 respectively mounted on the second yokes 92. One of the second magnet members 94 faces the two tracking coils 72 mounted on one of the opposite ends of the lens holder 50 in the tangential direction T, and the other one of the magnet members 94 faces the other two tracking coils 72 mounted on the other one of the opposite ends of the lens holder 50 in the tangential direction T. The second yokes 92 guide magnetic lines generated by the second magnet members 94 so that the magnetic lines are focused in one direction, that is, toward the tilting coils 72, thereby maximizing the intensity of an effective magnetic field generated by the second magnet members 94. Each of the second magnet members 94 comprises two magnets having opposite polarities placed one above the other in the focusing direction F. For example, as shown in FIGS. 1 to 3, each of the second magnet members 94 includes a first magnet on the top having an N pole facing two of the tilting coils 72, and a second magnet on the bottom having an S pole facing the same two tilting coils 72. When electric currents are supplied to the tilting coils 72, the second magnet members 94 interact with the tilting coils 72 having the electric currents supplied thereto to drive the lens holder 50 in the focusing direction to perform focusing control, or to tilt the lens holder 50 about the tilting axis TA to perform tilting control. Specifically, if the electric currents supplied to the two tilting coils 72 at the opposite ends of the lens holder 50 in the tangential direction T on one side of the tilting axis TA are the same as the electric currents supplied to the two tilting coils 72 at the opposite ends of the lens holder 50 in the tangential direction T on the other side of the tilting axis TA, the lens holder 50 will move in the focusing direction F without tilting, and if the electric currents supplied to the two tilting coils 72 on the one side of the tilting axis TA are different from the electric currents supplied to the two tilting coils 72 on the other side of the tilting axis TA, the lens holder 50 will tilt.

Now, the operation of the optical pick-up actuator 100 according to the first embodiment of the present invention will be described with reference to FIGS. 4A and 4B.

Figure 4A:
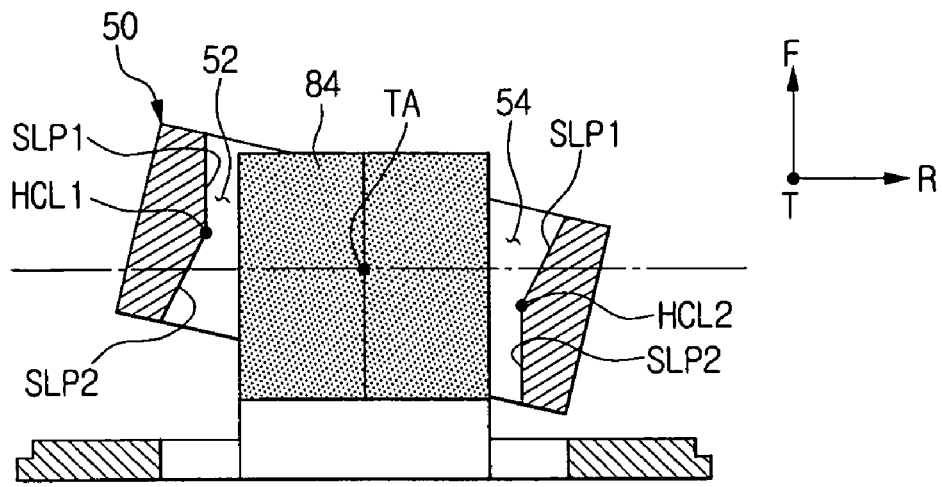
FIGS. 4A and 4B are cross-sectional views showing the tilting movement of the lens holder of the optical pick-up actuator shown in FIG. 3.
Figure 4B:
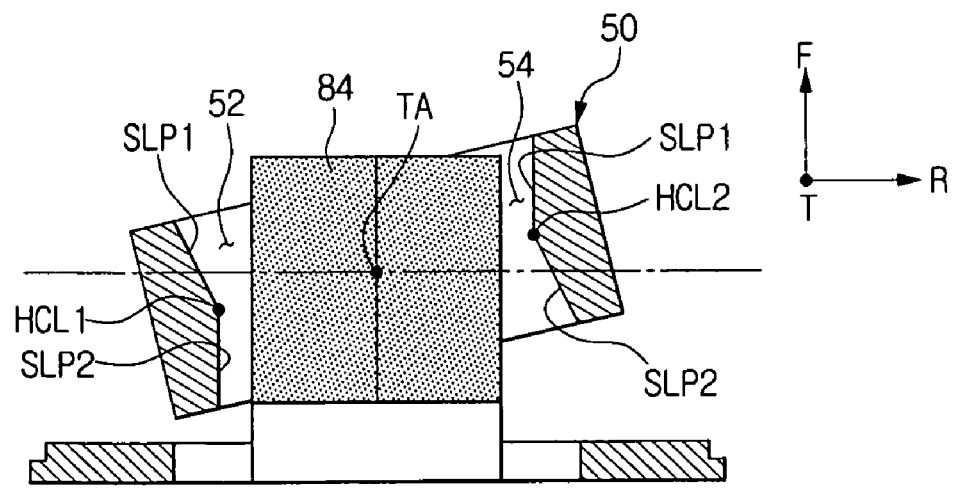

Referring to FIGS. 4A and 4B, a power supply (not shown) supplies electric currents to the tilting coils 72 so that the electric currents supplied to the two tilting coils 72 on the one side of the tilting axis TA have magnitudes and/or directions that are different from the magnitudes and/or directions of the electric currents supplied to the two tilting coils 72 on the other side of the tilting axis TA, thereby tilting the lens holder 50 about the tilting axis TA.

When the lens holder 50 tilts about the tilting axis TA and the end walls of the first and second grooves 52, 54 are the end walls in the related art that do not have sloping surfaces, the top or bottom ends of the end walls in the focusing direction F will be the parts of the end walls that are closest to the first magnet members 84. Accordingly, in the related art, a tracking margin in which the lens holder 50 is free to move in the radial direction R when the tracking control is being performed while the lens holder 50 is tilted is determined by the gaps between the top or bottom ends of the end walls of the first and second grooves 52, 54 in the focusing direction F and the first magnet members 84. According to the first embodiment of the present invention, however, because the end walls of the first and second grooves 52, 54 have the first and second sloping surfaces SLP1, SLP2, the tracking margin while the lens holder 50 is tilted is determined by the gaps between centers of the end walls through which the center lines HCL1, HCL2 extend and the first magnet members 84, which gaps are larger than the gaps between the top or bottom ends of the end walls of the first and second grooves 52, 54 that do not have sloping surfaces as in the related art and the first magnet members 84. Accordingly, in the first embodiment of the present invention, a larger tracking margin while the lens holder 50 is tilted is provided due to the first and second sloping surfaces SLP1, SLP2 as compared to the related art. The first and second sloping surfaces SLP1, SLP2 also make it possible to provide a larger angle through which the lens holder 50 is free to tilt while the tilting control is being performed, i.e., a larger tilting margin.

Figure 5:
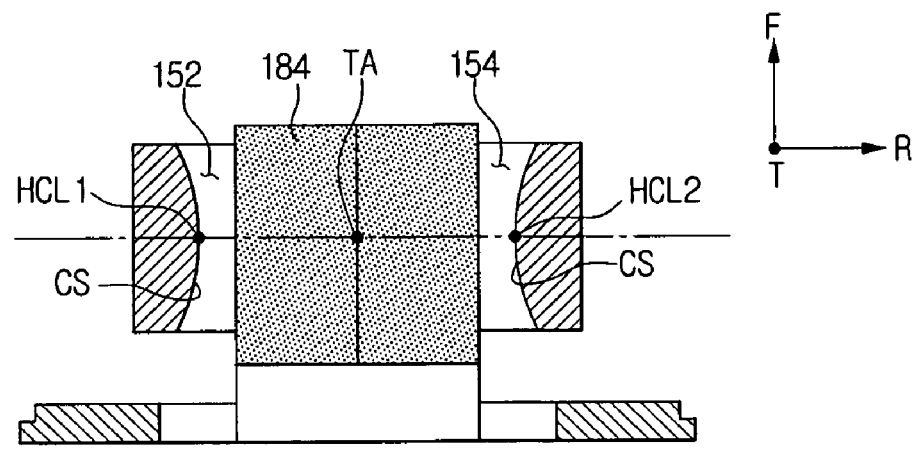
FIG. 5 is a cross-sectional view showing an optical pick-up actuator according to a second embodiment of the present invention.

FIG. 5 is a cross-sectional view showing a second embodiment of the present invention. According to the second embodiment of the present invention, end walls of first and second grooves 152, 154 have curved surfaces CS as shown in FIG. 5, instead of the first and second sloping surfaces SLP1, SLP2 of the end walls of the first and second grooves 52, 54 of the first embodiment. It is preferable that the curved surfaces CS are hemispherical surfaces. If the end walls of the first and second grooves 152, 154 are hemispherical surfaces, it is possible to provide larger tilting and tracking margins than in the related art according to the same principle as in the first embodiment of the present invention.

Although it has been described that the first and second sloping surfaces SLP1 or SLP2 or the curved surfaces CS are formed on the end walls of the first and second grooves 52, 54 or 152, 154 formed in the lens holder 50, it is also possible to provide tilting and tracking margins larger than those provided in the related art if the end walls of the first and second grooves 52, 54 or 152, 154 have other shapes as long as the end walls are not parallel to the first magnet members 84 or 184 when the lens holder 50 is not tilted and the centers of the end walls are the closest parts of the end walls to the first magnet members 84 at every tilting angle of the lens holder 50 about the tilting axis TA. In addition, although it has been described in the embodiments of the present invention that the lens holder 50 is tilted in the radial direction R, that is, the lens holder 50 is tilted about the tilting axis TA parallel to the tangential direction T, the present invention is equally applicable to a case in which the lens holder 50 is tilted in the tangential direction T, that is, the lens holder 50 is tilted about a tilting axis parallel to the radial direction R.

Figure 6:
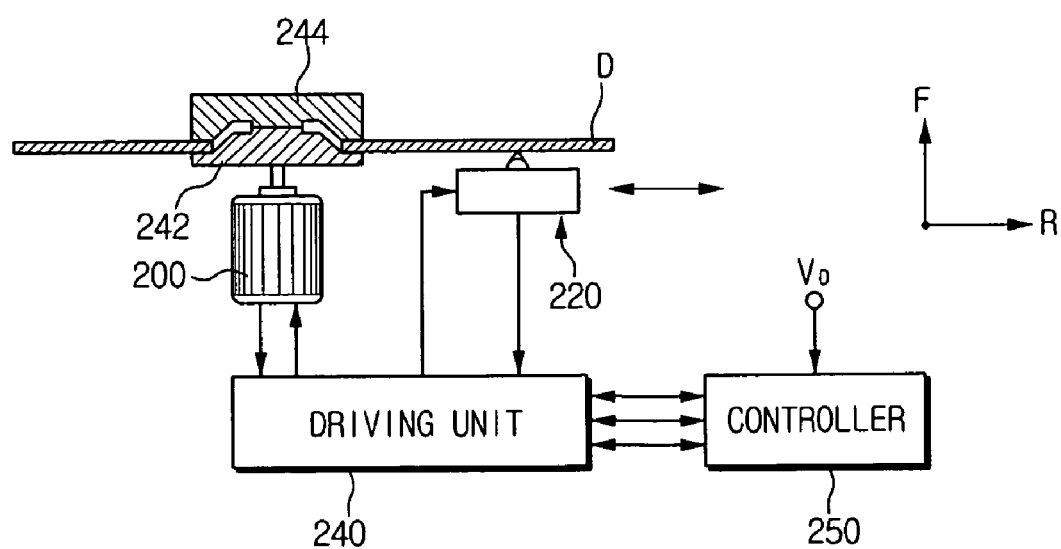
FIG. 6 is a schematic block diagram of an optical recording and/or reproducing apparatus which uses an optical pick-up actuator according to an aspect of the present invention.

FIG. 6 is a schematic block diagram of an optical recording and/or reproducing apparatus which uses an optical pick-up actuator according to an aspect of the present invention.

Referring to FIG. 6, the optical recording and/or reproducing apparatus includes a spindle motor 200 to rotate an optical medium D such as an optical disc, an optical pick-up 220 which is movable in a radial direction R of the optical medium D, i.e., in a tracking direction, to record and/or reproduce information onto and/or from the optical medium D, and a driving unit 240 to drive the spindle motor 200 and the optical pick-up 220. Here, reference numeral 242 indicates a turntable, and reference numeral 244 indicates a chuck to clamp the optical medium D on the turntable 242.

The optical pick-up 220 includes an optical system (not shown) having objective lenses 1, 2 (see FIG. 1) to focus light from a light source (not shown) onto the optical medium D, and an optical pick-up actuator 100 (see FIG. 1) to drive the objective lenses 1, 2 in a focusing direction F and the radial direction R, and to tilt the objective lenses 1, 2 about a tilting axis parallel to a tangential direction T of the optical medium D. The optical pick-up actuator 100 described above with reference to FIGS. 1 to 5 may be used as the optical pick-up actuator 100 of the optical recording and/or reproducing apparatus of the present embodiment of the present invention.

During operation of the optical recording and/or reproducing apparatus, light reflected from the optical medium D is detected by an optical detector (not shown) provided in the optical pick-up 220 which photoelectrically converts the detected light into an electrical signal. The electrical signal is inputted into a controller 250 through the driving unit 240. The controller 250 controls the driving unit 240 to move the optical pick-up 220 in the radial direction R and to control the rotation of the spindle motor 200. In addition, the controller 250 controls the optical pick-up actuator 100 to perform tracking control, focusing control, and tilting control according to the electrical signal.

As described above, according to an aspect of the present invention, it is possible to provide larger tracking and tilting margins as compared to the related art by forming sloping surfaces, curved surfaces, or surfaces having other shapes on the end walls of grooves formed in a lens holder. By providing such larger tracking and tilting margins, it is possible to increase the stability of a servo control system of an optical pick-up actuator.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pick-up actuator comprising:
   a base;
   a lens holder mounted on the base to be tiltable about a tilting axis of the lens holder, at least one objective lens being mounted on the lens holder, and at least one groove being formed in the lens holder; and
   a magnet unit mounted on the base and extending into the at least one groove;
   wherein walls of the at least one groove facing the magnet unit in a direction transverse to the tilting axis comprise sloping surfaces providing a tilting margin to enable tilting control to be performed.

2. The optical pick-up actuator of claim 1, wherein center lines which are parallel to the tilting axis extend through centers of the walls of the at least one groove facing the magnet unit as viewed in directions of the center lines; and
   wherein each of the sloping surfaces comprises a first sloping surface and a second sloping surface each inclined away from the magnet unit beginning at one of the centers of the walls of the at least one groove facing the magnet unit as viewed in the direction of one of the center lines.

3. The optical pick-up actuator of claim 2, wherein a focusing direction of the lens holder is perpendicular to the tilting axis;
   wherein reference axes which are parallel to the focusing direction intersect the centers of the end walls of the at least one groove facing the magnet unit as viewed in the directions of the center lines when the lens holder is not tilted; and
   wherein an angle between the first sloping surface and one of the reference axes when the lens holder is not tilted and an angle between the second sloping surface and one of the reference axes when the lens holder is not tilted are larger than a maximum tilting angle of the lens holder about the tilting axis.

4. The optical pick-up actuator of claim 3, wherein a tangential direction of the lens holder is perpendicular to the tilting axis and the focusing direction; and wherein the at least one groove comprises a first groove and a second groove parallel to each other and spaced apart from each other in the tangential direction.

5. The optical pick-up actuator of claim 1, wherein the magnet unit comprises a yoke mounted on the base.

6. The optical pick-up actuator of claim 5, wherein the magnet unit further comprises a magnet member mounted on one side of the yoke.

7. An optical pick-up actuator comprising:
a base;
a lens holder mounted on the base to be tiltable about a tilting axis of the lens holder, at least one objective lens being mounted on the lens holder, and at least one groove being formed in the lens holder; and
a magnet unit mounted on the base and extending into the at least one groove;
wherein walls of the at least one groove facing the magnet unit in a direction transverse to the tilting axis comprise curved surfaces providing a tilting margin to enable tilting control to be performed.

8. The optical pick-up actuator of claim 7, wherein the curved surfaces are hemispherical surfaces.

9. An optical pick-up actuator comprising:
a base;
a lens holder mounted on the base to be tiltable about a tilting axis of the lens holder, at least one objective lens being mounted on the lens holder, and at least one groove being formed in the lens holder;
a first magnet unit mounted on the base and extending into the at least one groove; and
at least one tracking coil mounted on a wall of the at least one groove facing the first magnet unit in a direction of the tilting axis;
wherein walls of the at least one groove facing the first magnet unit in a direction transverse to the tilting axis comprise sloping surfaces providing a tilting margin to enable tilting control to be performed and a tracking margin to enable tracking control to be performed.

10. The optical pick-up actuator of claim 9, further comprising:
a second magnet unit mounted on the base outside of the lens holder so that the second magnet unit is parallel to the first magnet unit and spaced apart from the first magnet unit in the direction of the tilting axis; and
at least one tilting coil mounted on an external surface of the lens holder facing the second magnet unit in the direction of the tilting axis.

11. An optical recording and/or reproducing apparatus comprising:
an optical pick-up comprising an actuator to drive at least one objective lens, the optical pick-up being mounted to be movable in a radial direction of an optical medium to record and/or reproduce information onto and/or from the optical medium; and
a controller to control driving of the optical pick-up;
wherein the actuator comprises
a base,
a lens holder mounted on the base to be tiltable about a tilting axis of the lens holder, the at least one objective lens being mounted on the lens holder, and at least one groove being formed in the lens holder, and
a magnet unit mounted on the base and extending into the at least one groove,
wherein walls of the at least one groove facing the magnet unit in a direction transverse to the tilting axis comprise sloping surfaces providing a tilting margin to enable tilting control to be performed and a tracking margin to enable tracking control to be performed.

12. The optical recording and/or reproducing apparatus of claim 11, wherein center lines which are parallel to the tilting axis extend through centers of the walls of the at least one groove facing the magnet unit as viewed in directions of the center lines;
wherein each of the sloping surfaces comprises a first sloping surface and a second sloping surface each inclined away from the magnet unit beginning at one of the centers of the walls of the at least one groove facing the magnet unit as viewed in the direction of one of the center lines;
wherein a focusing direction of the lens holder is perpendicular to the tilting axis;
wherein reference axes which are parallel to the focusing direction intersect the centers of the end walls of the at least one groove facing the magnet unit as viewed in the directions of the center lines when the lens holder is not tilted; and
wherein an angle between the first sloping surface and one of the reference axes when the lens holder is not tilted and an angle between the second sloping surface and one of the reference axes when the lens holder is not tilted are larger than a maximum tilting angle of the lens holder about the tilting axis.

13. The optical recording and/or reproducing apparatus of claim 12, wherein a tangential direction of the lens holder is perpendicular to the tilting axis and the focusing axis; and
wherein the at least one groove comprises a first groove and a second groove parallel to each other and spaced apart from each other in the tangential direction.

14. An optical pick-up actuator comprising:
a base;
a lens holder mounted on the base to be tiltable about a tilting axis of the lens holder and having at least one groove formed therein;
at least one objective lens mounted on the lens holder; and
a magnet unit mounted on the base and extending into the at least one groove;
wherein walls of the at least one groove facing the magnet unit in a direction transverse to the tilting axis have a shape that prevent gaps between the walls and the magnet unit from being reduced when the lens holder is tilted about the tilting axis.

15. The optical pick-up actuator of claim 14, wherein the gaps between the walls and the magnet unit provide a tilting margin in which the lens holder is free to tilt about the tilting axis to enable the optical pick-up actuator to perform tilting control, and a tracking margin in which the lens holder is free to move in the direction transverse to the tilting axis to enable the optical pick-up actuator to perform tracking control.

16. The optical pick-up actuator of claim 15, wherein the shape of the walls prevents the tilting margin from being reduced when the optical pick-up actuator performs tracking control, and prevents the tracking margin from being reduced when the optical pick-up actuator performs tilting control.

17. The optical pick-up actuator of claim 14, wherein center lines which are parallel to the tilting axis extend through centers of the walls as viewed in directions of the center lines; and
wherein the shape of the walls is such that the centers of the walls are closer to the magnet unit than any other part of the walls at every tilting angle of the lens holder about the titling axis.

18. The optical pick-up actuator of claim 17, wherein the walls slope from the centers of the walls to ends of the walls as viewed in the directions of the center lines.

19. The optical pick-up actuator of claim 18, wherein the walls slope from the centers of the walls to the ends of the walls in straight lines at slope angles which are greater than a maximum tilting angle of the lens holder about the tilting axis, the slope angles being measured relative to axes which intersect the centers of the walls as viewed in the directions of the center lines and which are perpendicular to the center lines and perpendicular to the direction transverse to the tilting direction.

20. The optical pick-up actuator of claim 17, wherein the walls curve from the centers of the walls to ends of the walls as viewed in the directions of the center lines.

21. The optical pick-up actuator of claim 20, wherein the walls curve from the centers of the walls to the ends of the walls in a hemispherical curve.

22. The optical pick-up actuator of claim 14, further comprising at least one tracking coil mounted on a wall of the at least one groove facing the magnet unit in a direction of the tilting axis;
wherein supplying a current to each of the at least one tracking coil causes the magnet unit to interact with the at least one tracking coil having the current supplied thereto to drive the lens holder in the direction transverse to the tilting axis to perform tracking control.

23. The optical pick-up actuator of claim 22, wherein the magnet unit is a first magnet unit; and
wherein the optical pick-up actuator further comprises
a second magnet unit mounted on the base outside of the lens holder so that the second magnet unit is parallel to the first magnet unit and is spaced apart from the first magnet unit in the direction of the tilting axis, and
at least one tilting coil mounted on an external surface of the lens holder facing the second magnet unit in the direction of the tilting axis;
wherein supplying a current to each of the at least one tilting coil in a first manner causes the second magnet unit to interact with the at least one tilting coil having the current supplied thereto in the first manner to tilt the lens holder about the tilting axis to perform tilting control; and
wherein supplying a current to each of the at least one tilting coil in a second manner causes the second magnet unit to interact with the at least one tilting coil having the current supplied thereto in the second manner to drive the lens holder in a direction perpendicular to the tilting axis and perpendicular to the direction transverse to the tilting axis to perform focusing control.

24. The optical pick-up actuator of claim 14, wherein the tilting axis is parallel to a tangential direction of the optical pick-up actuator corresponding to a tangential direction of an optical medium so that the lens holder is tiltable in a radial direction of the optical pick-up actuator perpendicular to the tangential direction of the optical pick-up actuator and corresponding to a radial direction of the optical medium.

25. The optical pick-up actuator of claim 14, wherein the tilting axis is parallel to a radial direction of the optical pick-up actuator corresponding to a radial direction of an optical medium so that the lens holder is tiltable in a tangential direction of the optical pick-up actuator perpendicular to the radial direction of the optical pick-up actuator and corresponding to a tangential direction of the optical medium.

* * * * *